(12) United States Patent
Doshi et al.

(10) Patent No.: US 6,243,734 B1
(45) Date of Patent: Jun. 5, 2001

(54) COMPUTER PRODUCT AND METHOD FOR SPARSE MATRICES

(75) Inventors: Gautam Doshi, Sunnyvale, CA (US); Roger Golliver, Beaverton; Bob Norin, Tigard, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/183,065

(22) Filed: Oct. 30, 1998

(51) Int. Cl.[7] ........................................................ G06F 7/52
(52) U.S. Cl. .................................................................. 708/607
(58) Field of Search ................................... 708/203, 520, 708/514, 620, 607

(56) References Cited

U.S. PATENT DOCUMENTS

| | | | |
|---|---|---|---|
| 4,914,615 | * 4/1990 | Karmarker et al. | 708/607 |
| 5,206,822 | * 4/1993 | Taylor | 708/607 |
| 5,267,185 | 11/1993 | Akabane et al. | |
| 5,878,424 | * 3/1999 | Dooling et al. | 707/102 |
| 5,905,666 | * 5/1999 | Hoffman et al. | 364/468.05 |

FOREIGN PATENT DOCUMENTS

PCT/US99/23967  10/1999 (WO) .

* cited by examiner

Primary Examiner—Chuong Dinh Ngo
(74) Attorney, Agent, or Firm—Blakely, Sokoloff, Taylor & Zafman LLP

(57) ABSTRACT

A computer program product and method for multiplying a sparse matrix by a vector are disclosed. The computer program product includes a computer readable medium for storing instructions, which, when executed by a computer, cause the computer to efficiently multiply a sparse matrix by a vector, and produce a resulting vector. The computer is made to create a first array containing the non-zero elements of the sparse matrix, and a second array containing the end_of_row position of the last non-zero element in each row of the sparse matrix. A variable is initialized, and then, for each row of the second array, the computer is made to do one of two things. Either, it equates the variable to the sum of the variable and the product of a particular element of the first array and a particular element of the vector. Or, it equates a particular element of the resulting vector to the variable, and then equates the variable to a particular value.

138 Claims, 10 Drawing Sheets

COMPUTER PRODUCT AND METHOD FOR SPARSE MATRICES

BACKGROUND OF THE INVENTION

1. Field of the Invention

This invention relates generally to computers, and more particularly, to computer program products and methods for causing a computer to function in a particular efficient fashion.

2. Description of the Related Art

Modern computers contain microprocessors, which are essentially the brains of the computer. In operation, the computer uses the microprocessor to run a computer program.

The computer program might be written in a high-level computer language, such as C or C++, using statements similar to English, which statements are then translated (by another program called a compiler) into numerous machine-language instructions. Or the program might be written in assembly language, and then translated (by another program called an assembler) into machine-language instructions. In practice, every computer language above assembly language is a high-level language.

Each computer program contains numerous instructions, which tell the computer what precisely it must do, to achieve the desired goal of the program. The computer runs a particular computer program by executing the instructions contained in that program.

Frequently the goal of the program is to solve complicated real world problems which can be described in mathematical terms. Modern microprocessors permit such programs to be rapidly executed using techniques such as pipelining and speculative execution.

Modern microprocessors use a design technique called a pipeline, in which the output of one process serves as input to a second, the output of the second process serves as input to a third, and so on, often with more than one process occurring during a particular computer clock cycle.

Pipelining is a method used in some microprocessors of fetching and decoding instructions in which, at any given time, several program instructions are in various stages of being fetched or decoded. Ideally, pipelining speeds execution time by insuring that the microprocessor does not have to wait for instructions; when it completes execution of one instruction, the next is ready and waiting. In order to have the next instruction that is to be executed ready and waiting in the pipeline, the microprocessor somehow must predict what that instruction will be.

Branch prediction is a technique used in some microprocessors to guess whether or not a particular path in a program—called a branch—will be taken during program execution, and to fetch instructions from the appropriate location. When a branch instruction is executed, it and the next instruction executed are stored in a buffer. This information is used to predict which way the instruction will branch the next time it is executed. When the prediction is correct, executing a branch does not cause a pipeline break, so the system is not slowed down by the need to retrieve the next instruction. When the prediction is incorrect, a pipeline break does occur, and the system is slowed down because it then needs to locate and retrieve the next instruction. Such incorrect predictions are sometimes called branch mispredictions.

Speculative execution is a technique used in some microprocessors in which certain instructions are executed and results made available before the results are actually needed by the program, so that the results are ready and waiting when the program needs them. Which instructions are to be executed speculatively is based on the guesses made about which branches in the program will be taken. In general, when a branch is mispredicted and instructions speculatively executed based on that incorrect branch prediction, the results of the speculatively executed instructions must be discarded, and consequently the computer time and resources used to obtain the now discarded results are wasted.

Real-world problems frequently can be expressed mathematically using a group of equations generally referred to as a system of simultaneous equations. Those equations, in turn, can be expressed in what is sometimes called matrix form, described more fully below. A computer can then be used to manipulate and perform calculations with the matrices, and solve the problem.

A matrix is a set of numbers arranged in rows and columns so as to form a rectangular array. The numbers are called the elements of the matrix. If there are m rows and n columns, the matrix is said to be "m by n" matrix, written "m×n". For example, $$\begin{bmatrix} 1 & 3 & 8 \\ 2 & -4 & 5 \end{bmatrix}$$

is a 2×3 matrix; it has two rows, and three columns. A matrix with m rows and m columns is called a square matrix of order m. An ordinary number can be regarded as a 1×1 matrix; thus, the number 3 can be thought of as the matrix [3].

In a common notation, a capital letter denotes a matrix, and the corresponding small letter with a double subscript denotes an element of that matrix. Thus, $a_{ij}$ is the element in the ith row and the jth column of the matrix A. If A is the 2×3 matrix shown above, then $a_{11}$ equals 1, $a_{12}$ equals 3, $a_{13}$ equals 8, $a_{21}$ equals 2, $a_{22}$ equals −4, and $a_{23}$ equals 5. Under certain conditions described more fully below, matrices can be added and multiplied as individual entities.

Matrices occur naturally in systems of simultaneous equations. In the following system for the unknowns x and y, $2x+3y=7$ $3x+4y=10$ the array of numbers $$\begin{bmatrix} 2 & 3 & 7 \\ 3 & 4 & 10 \end{bmatrix}$$

is a matrix whose elements are the coefficients of the unknowns. The solution of the equations depends entirely on these numbers and on their particular arrangement. If 7 and 10 were interchanged, the solution would not be the same.

A matrix A can be multiplied by an ordinary number c, which is called a scalar. The product is denoted by cA or Ac, and is the matrix whose elements are $ca_{ij}$.

The multiplication of a matrix A by a matrix B to yield a matrix C is defined only when the number of columns of the matrix A equals the numbers of rows of the matrix B. To determine the element $c_{ij}$, which is in the ith row and the jth column of the product, the first element in the ith row of A is multiplied by the first element in the jth column of B, the second element in the row by the second element in the column, and so on until the last element in the row is multiplied by the last element of the column; the sum of all these products gives the element $c_{ij}$. In symbols, for the situation where A has n columns and B has n rows, $$C_{ij} = a_{i1}b_{1j} + a_{i2}b_{2j} + \ldots + a_{in}b_{nj}.$$

The matrix C has as many rows as A, and as many columns as B. Thus if A has m rows and n columns, and B has n rows and p columns, then C has m rows and p columns.

When B has only one column, that is, p=1, B is sometimes referred to as a column vector, or simply a vector. In a common notation, a single subscript is used to denote elements of a vector. Thus, $v_i$ is the ith element of the vector V.

The multiplication of a matrix A by a vector V to yield a vector D is defined only when the number of columns of the matrix A equals the number of elements of the vector V. Thus, multiplying an m×n matrix A by an n-element vector V, yields an m element vector D, the elements of which are indicated below, where the symbol "*" denotes multiplication.

$$D = A * V = \begin{bmatrix} a_{11} & a_{12} & a_{13} & \ldots & a_{1n} \\ a_{21} & a_{22} & & & a_{2n} \\ a_{31} & & & & \\ \vdots & & & & \\ a_{m1} & & & & a_{mn} \end{bmatrix} \begin{bmatrix} v_1 \\ v_2 \\ v_3 \\ \vdots \\ v_n \end{bmatrix}$$

$$= \begin{bmatrix} a_{11}v_1 + a_{12}v_2 + a_{13}v_3 \ldots + a_{1n}v_n \\ a_{21}v_1 + a_{22}v_2 + a_{2n}v_n \\ \vdots \\ a_{m1}v_1 + a_{m2}v_2 + \ldots a_{mn}v_n \end{bmatrix}$$

The individual elements of a matrix may be zero or non-zero. A matrix in which the non-zero elements amount to a very small percentage of the total number of elements, is sometimes referred to as a sparse matrix. Sparse matrices occur frequently in practice. Problems such as structural analysis, network flow analysis, different approximations to differential equations, finite element analysis, fmancial modeling, fluid dynamics, and so forth, all lead to sparse matrices. Because sparse matrices, and particularly large sparse matrices, frequently occur, techniques have been developed to take advantage of the large number of zeros contained in the sparse matrix, to avoid unnecessary computation and unnecessary storage.

When computers are used for sparse matrix computations, the sparse matrix usually is stored in a compressed form to reduce the storage requirements. In one such known compressed form, only the non-zero elements of the matrix are stored, along with the row and column location for each non-zero element.

In one known prior art method, the non-zero elements of each row of the sparse matrix are stored linearly in a first array, and a second array is used to keep track of the locations in the first array corresponding to the end of each row of the sparse matrix. A third array is used to keep track of the column location in the sparse matrix for each element in the first array. A known prior art method for computing the product of such a sparse matrix with a vector is illustrated in FIG. 1, and sample code is set forth below; in each the first array is called "matrix", the second array is called "end_of_row", the third array is called "column", and the resulting vector is called "result".

```
do row = 1, number_of_rows
    result (row) = 0.0
    do i = (end_of_row(row-1)+1), end_of_row(row)
        result (row) = result (row) + matrix(i) * vector(column(i))
    end do
end do
```

When using this prior art technique to compute the product of a sparse matrix with a vector, it is necessary to determine the column index of each element in the first array, and compute its product with the corresponding element in the vector. This product is then accumulated until the end of the row is reached. Once the end of the row is reached, the accumulator is cleared, and the process is repeated for the next row. This is done until all the rows are processed.

The prior art method illustrated in FIG. 1 and in the sample code above, includes two DO loops: an outer DO loop; and an inner DO loop. The inner DO loop, denoted by reference numeral 210 in FIG. 2, includes, in general, steps 130, 140, 145 and 150 of FIG. 1; the outer DO loop, denoted by reference numeral 220 in FIG. 2, includes, in general, steps 110, 120, 155 and 160 of FIG. 1.

The inner DO loop is data dependent. That is, the number of times the inner loop calculations are performed is determined by the number of non-zero elements in each row of the sparse matrix. A particular row might have a small number of elements, or a large number of elements; the number of elements is not known until the calculations are made. This results in branch mispredictions caused by the microprocessor predicting the next computation will be in the inner loop when, in reality, because of the data, another branch of the program—the branch for the outer DO loop—must be executed next.

In the illustrated prior art method, such branch mispredictions can occur at the end of each row of the sparse matrix, that is, at the end of each inner DO loop. Such branch mispredictions in modern microprocessors result in lost performance.

The present invention is directed to overcoming, or at least reducing, the effects of one or more of the problems mentioned above.

SUMMARY OF THE INVENTION

In one aspect of the present invention, provided is a computer readable medium for storing instructions, which, when executed by a computer, cause the computer to efficiently multiply a sparse matrix by a vector by performing certain steps. The steps include creating a first array containing the non-zero elements of the sparse matrix, creating a second array containing the row position of the last non-zero element in each row of the sparse matrix, and initializing a variable. Then, executing a set of instructions for each element of the second array, the steps include either equating the variable to the sum of the variable and the product of a particular element of the first array and a particular element of the vector, or equating a particular element of the resulting vector to the variable and then equating the variable to a particular value.

In one embodiment of the invention, the set of instructions is predicated. Yet in another embodiment of the invention, the invention further comprises the step of prefetching the elements of the matrix array and elements of the column array from memory.

Another aspect of the invention shows an allocation control mechanism separating the elements with temporal locality from the elements of spatial locality. The elements with temporal locality is then stored in a cache memory.

According to another aspect of the invention, the steps also include creating a third array containing the column position of each of the non-zero elements of the matrix, and using that third array to select the particular element of the vector that is to be multiplied.

According to yet another aspect of the present invention, the vector is stored in cache memory, and the first, second, and third arrays are stored in a different memory, such that the vector is accessed via a particular access path and the arrays are accessed via a different access path.

BRIEF DESCRIPTION OF THE DRAWINGS

Other objects and advantages of the invention will become apparent upon reading the following detailed description and upon reference to the drawings in which.

Figure 1:
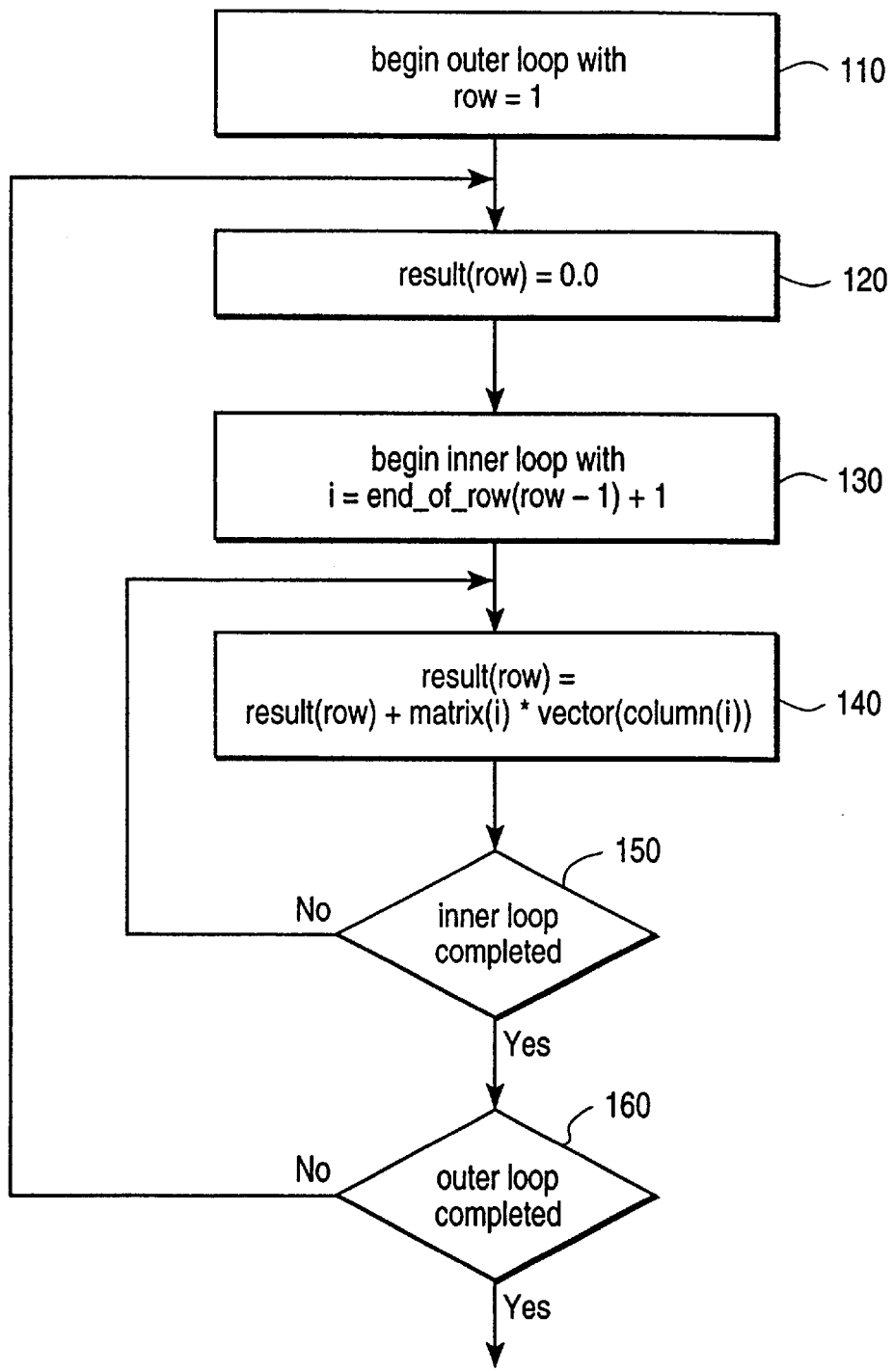
FIGS. 1 and 2 illustrate a known prior art method.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Performance of sparse matrix computations on modem microprocessors, using known methods, suffers because of the inherent unpredictability of the inner loop closing branch, which results in branch mispredictions. The iteration count of the inner loop is data dependent, and consequently follows no deterministic pattern for general sparse matrices.

The present invention eliminates such unpredictability, thereby eliminating the performance loss due to such branch mispredictions. The present invention collapses the nested loops of the known technique illustrated in FIG. 1, into a single larger loop wherein the instructions in the loop is predicated. This increases the scope of prefetching and enables better latency tolerance. The present invention also makes use of otherwise wasted computations resulting from branch mispredictions. The present invention, by managing cache allocation, also permits data to be organized to maximize bandwidth utilization.

FIG. 1 shows an inefficient nested loop formulation. The inner loop count is small and the loop overhead is large. The "end do" for the "do i" loop is flaky, meaning that the branch could go either way, thus making it hard for the branch predictor to predict the right direction. Hence, this flakiness causes branch misprediction.

Figure 3:
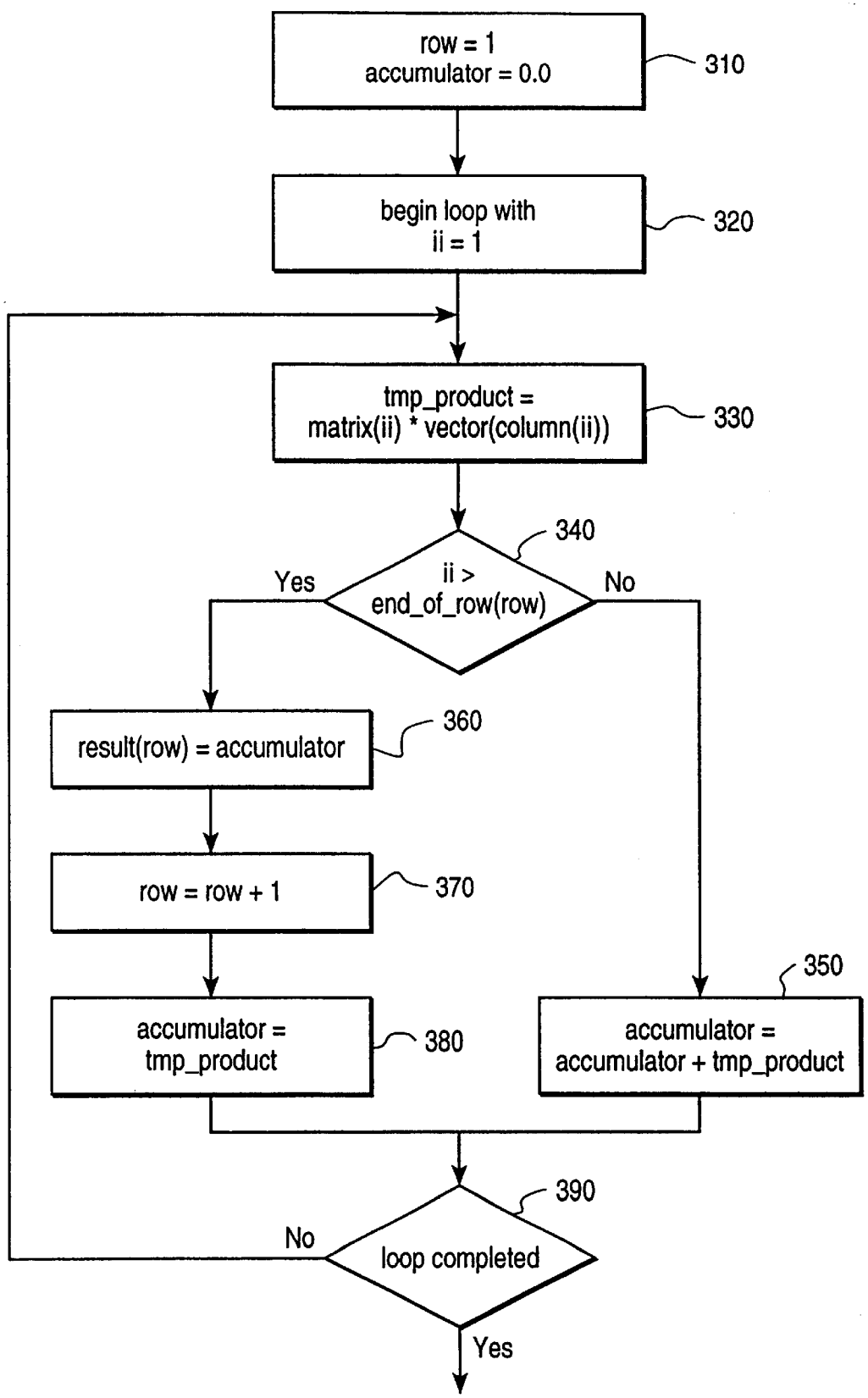
FIGS. 3, 3a, and 4 illustrate a method according to one embodiment of the present invention.

The present invention solves this problem by collapsing the two loops shown in prior art into one as shown in FIG. 3 and using predication. Predication eliminates the remaining flakiness that still exists after collapsing the loops. The idea here is that every instruction in the instruction set is augmented with a field that says "execute this instruction if the predicate is true." The predicate is a flag, a logical, a Boolean value that says true or false. In the present invention, the Boolean value is the condition "if, then, else statements." When the condition is evaluated, the result is either true or false. Typically, a set of instructions is executed when the condition is true and another set of instructions is executed if the condition is false. Predication, on the other hand, executes both sets of instructions in one sequence. By predicating the instructions that are to be executed in the single collapsed loop, the instructions are executed in one flow. The branches are removed from the equation. Thus, the control flow depicted in the prior art (FIG. 1) is converted into data flow as shown in FIG. 3. Since the present invention does not involve branches, the present invention does away with branch mispredictions. Consequently, by collapsing the two loops shown in prior art (FIG. 1) into one as shown in FIG. 3 and using predication, the present invention eliminates the problem of branch mispredictions.

To help describe the present invention, specific mathematical examples are used. Obviously, these examples are used for illustrative purposes only, and the present invention is not limited to these examples.

The matrix A, $$\begin{bmatrix} 1 & 0 & 0 & 0 & 5 & 0 & 0 & 0 & 0 & 0 \\ 0 & 0 & 4 & 0 & 0 & 2 & 0 & 0 & 6 & 0 \\ 0 & 0 & 0 & 12 & 0 & 0 & 0 & 0 & 0 & 0 \\ 0 & 4 & 0 & 0 & 0 & 0 & 3 & 0 & 0 & 0 \\ 2 & 0 & 0 & 0 & 3 & 0 & 0 & 1 & 3 & 0 \\ 0 & 0 & 0 & 13 & 2 & 1 & 4 & 0 & 0 & 0 \\ 0 & 1 & 0 & 0 & 0 & 0 & 0 & 8 & 0 & 0 \\ 3 & 6 & 8 & 0 & 0 & 0 & 0 & 0 & 0 & 11 \\ 0 & 0 & 0 & 0 & 0 & 0 & 0 & 3 & 0 & 0 \end{bmatrix}$$

is a 9×10 matrix, and thus has 90 elements. Of these, 23 are non-zero elements, and 67 are zero elements. Matrix A is therefore a sparse matrix because the non-zero elements amount to only a very small percentage of the total number of elements.

The vector V, $$V = \begin{bmatrix} 1 \\ 2 \\ 2 \\ 3 \\ 0 \\ 11 \\ 0 \\ 0 \\ 0 \\ 2 \end{bmatrix}$$

is a column vector containing 10 elements. Because the vector V has as many rows as the matrix A has columns, multiplication of the matrix A by the vector V is defined. The product of this multiplication, a vector C, $$C = A * V = \begin{bmatrix} c_1 \\ c_2 \\ c_3 \\ \vdots \\ c_9 \end{bmatrix}$$

has, as its first element $c_1$,
$c_1=(1\times1)+(0\times2)+(0\times2)+(0\times3)+(5\times0)+(0\times11)+(0\times0)+(0\times0)+(0\times0)+(0\times2)$ $C_1=1$;
as its second element, $c_2$,
$c_2=(0\times1)+(0\times2)+(4\times2)+(0\times3)+(0\times0)+(2\times11)+(0\times0)+(0\times0)+(0\times0)+(6\times0)+(0\times2)$ $c_2=22$;
and so forth. Because the matrix A has numerous zero elements, the computation for each of the elements $c_i$ of the vector C entails numerous multiplications by zero, which would not occur in a sparse representation.

According to one aspect of the present invention, three arrays are formed: A first array, containing the non-zero elements of the matrix A; a second array, containing the end_of_row locations of the first array; and a third array, containing the column locations of each element of matrix A. Each is described more fully below. Each is preferably, but need not be, a linear array.

For the example given above, the non-zero elements of the matrix A are: 1, 5, 4, 2, 6, 12, 4, 3, 2, 3, 1, 3, 13, 2, 1, 4, 1, 8, 3, 6, 8, 11, and 3. The first two of these elements, 1 and 5, are contained in the first row of the matrix A, and are located in columns 1 and 5, respectively. In the first row of the matrix A, 1 is the first non-zero element, and 5 is the last non-zero element; the last non-zero element in a particular row is called the end_of_row element for purposes of the present invention.

Similarly, in the second row of the matrix A, the first non-zero element is 4, the second non-zero element is 2, and the last non-zero element is 6. These three non-zero elements are located in columns 3, 6, and 9, respectively. The last of these three elements, 6, is the end_of_row element of the second row.

Table 1 sets forth similar information for each of the non-zero elements of matrix A.

TABLE 1

Non-zero element's of matrix A:

| non-zero element | element's position in first array | is element an end_of_row element | element's column position in matrix A |
|---|---|---|---|
| 1 | 1 | no | 1 |
| 5 | 2 | yes | 5 |
| 4 | 3 | no | 3 |
| 2 | 4 | no | 6 |
| 6 | 5 | yes | 9 |
| 12 | 6 | yes | 4 |
| 4 | 7 | no | 2 |
| 3 | 8 | yes | 7 |
| 2 | 9 | no | 1 |
| 3 | 10 | no | 5 |
| 1 | 11 | no | 8 |
| 3 | 12 | yes | 9 |
| 13 | 13 | no | 4 |
| 2 | 14 | no | 5 |
| 1 | 15 | no | 6 |
| 4 | 16 | yes | 7 |
| 1 | 17 | no | 2 |
| 8 | 18 | yes | 8 |
| 3 | 19 | no | 1 |
| 6 | 20 | no | 2 |
| 8 | 21 | no | 3 |
| 11 | 22 | yes | 10 |
| 3 | 23 | yes | 8 |

Accordingly, for the example given above, the first, second, and third arrays are as shown below.

First Array-the non zero elements of the matrix A:

1 5 4 2 6 12 4 3 2 3 1 3 13 2 1 4 1 8 3 6 8 11 3

Second Array-end_of_row locations of the first array:

2 5 6 8 12 16 18 22 23

Third Array-column locations of each element of the matrix A 1 5 3 6 9 4 2 7 1 5 8 9 4 5 6 7 2 8 1 2 3 10 8

In the description that follows, the first array is called "matrix", the second array is called "end_of_row", and the third array is called "column".

Referring now to the drawings, FIG. 3 illustrates the logic flow according to one embodiment of the present invention. In the steps denoted by reference numeral 310, two variables are initialized. The first, called "row", is a variable used to count rows. The second, called "accumulator", is used to accumulate particular calculated values.

The next step, denoted by reference numeral 320, begins a loop in which a variable, ii, is incremented, in increments of 1, starting with the value 1 and ending with the last non zero element of the matrix A.

A product, called "tmp_product", is then calculated in the step denoted by reference numeral 330, by multiplying a particular element of the first array, the "matrix" array, and a particular element of the vector V, called "vector" in FIG. 3.

A test of the variable ii is then performed in the step denoted by reference numeral 340. This step determines whether the variable ii is greater than the end_of_row location for the particular value of the variable "row". If it is not greater, then, in the step denoted by reference numeral 350, the variable "accumulator" is assigned the value equal to the sum of "accumulator" and "tmp_product". If, on the other hand, it is greater, then the steps denoted by reference numerals 360, 370, and 380 are performed. By those steps, the resulting vector C, called "result" in FIG. 3, is assigned a particular value. More specifically, the element of the resulting vector corresponding to the variable "row" is assigned the value of "accumulator". The variable "row" is incremented by 1, and the variable "accumulator" is assigned a particular value, namely the value of "tmp_product".

The decision of step 390 is then made, namely, whether or not the loop has been completed for all rows contained in the matrix A. That is, the loop of the do statement ends when ii=end_of_row(number_of_rows) as shown in the following sample code.

The final step 400 stores the value in the accumulator into the result(row) vector.

Sample code for implementing the embodiment illustrated in FIG. 3 is set forth below.

```
row = 1
accumulator = 0.0
do ii = 1, end_of_row(number_of_rows)
    tmp_product = matrix(ii) * vector (column (ii))
    if (ii>end_of_row (row)) then
        result (row)    = accumulator
        row             = row + 1
        accumulator     = 0.0 + tmp_product
    else
        accumulator     = accumulator + tmp_product
    endif
end do
result (row) = accumulator
```

Figure 2:
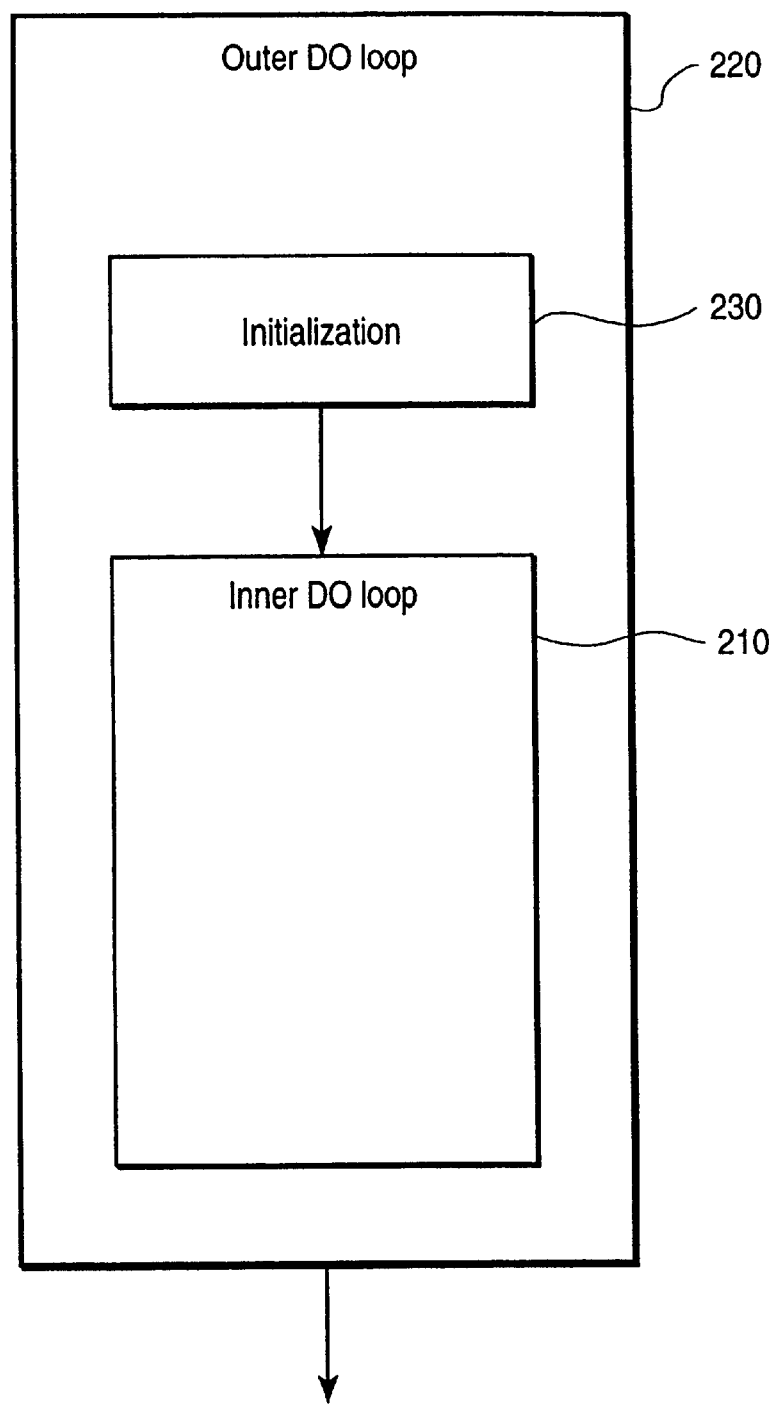
Figure 4:
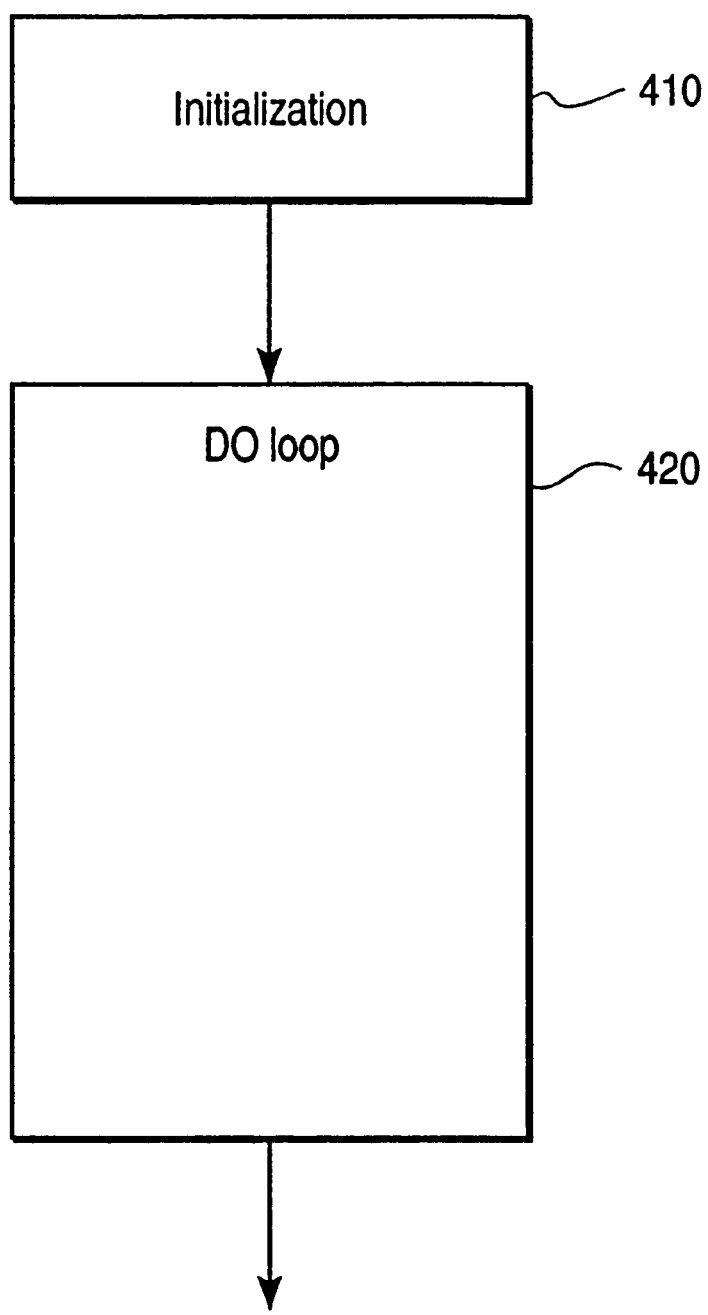

The embodiment illustrated in FIG. 3 produces the same resulting vector values as the prior art method illustrated in FIG. 1, but does so with only a single DO loop, whose bound is known at run time. Referring now to FIG. 4, the initialization block 410 includes the initialization steps denoted by the reference numeral 310 in FIG. 3, and the DO loop box 420 in FIG. 4 includes the steps denoted by the reference numerals 320, 330, 335, 340, 350, 360, 370, 380, and 390 in FIG. 3. FIG. 4, when compared with FIG. 2, illustrates the greatly reduced complexity of the present invention as shown in FIG. 3, from the prior art as shown in FIG. 1.

In the embodiment of the present invention illustrated in FIG. 3, and in the sample code set forth above, the calculations in the step 330 are performed and the resulting product assigned to the variable "tmp_product". In another embodiment of the present invention, illustrated in FIG. 5, those calculations are not made before the decision box regarding ii, denoted by reference numeral 340 in FIG. 3 and reference numeral 540 in FIG. 5, but rather are made in the steps of FIG. 5 denoted by reference numerals 550 and 580. Moving this calculation to before the decision regarding ii, as shown in FIG. 3 and in the sample code above, is a particular optimization of the embodiment illustrated in FIG. 5. Such an optimization, which is possible with the methods of the present invention, is not possible with the prior art method illustrated in FIG. 1, because of the nested DO loops of the prior art method.

Figure 5:
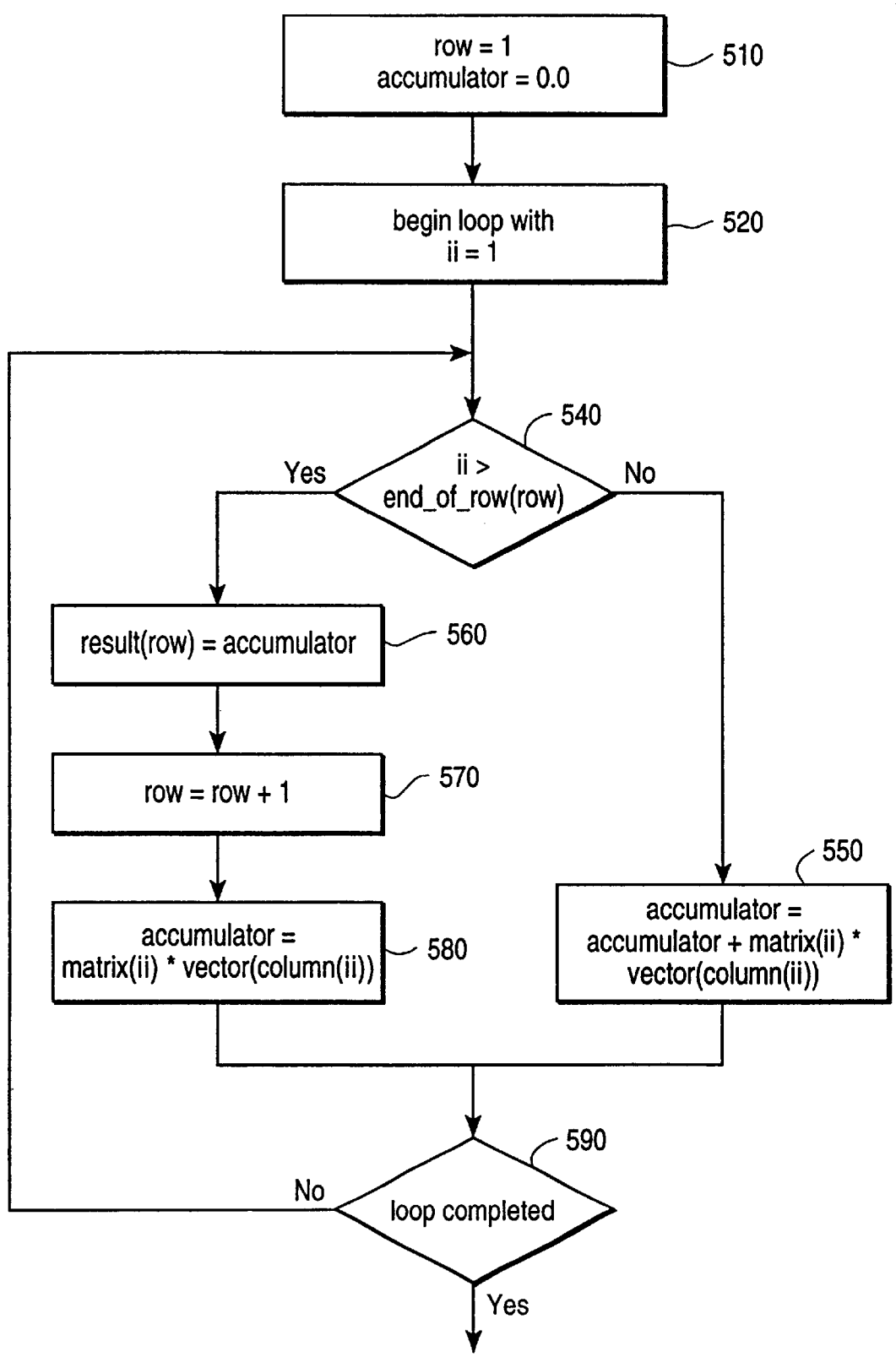
FIGS. 5 and 5a illustrate a method according to another embodiment of the present invention.
Figure 5A:
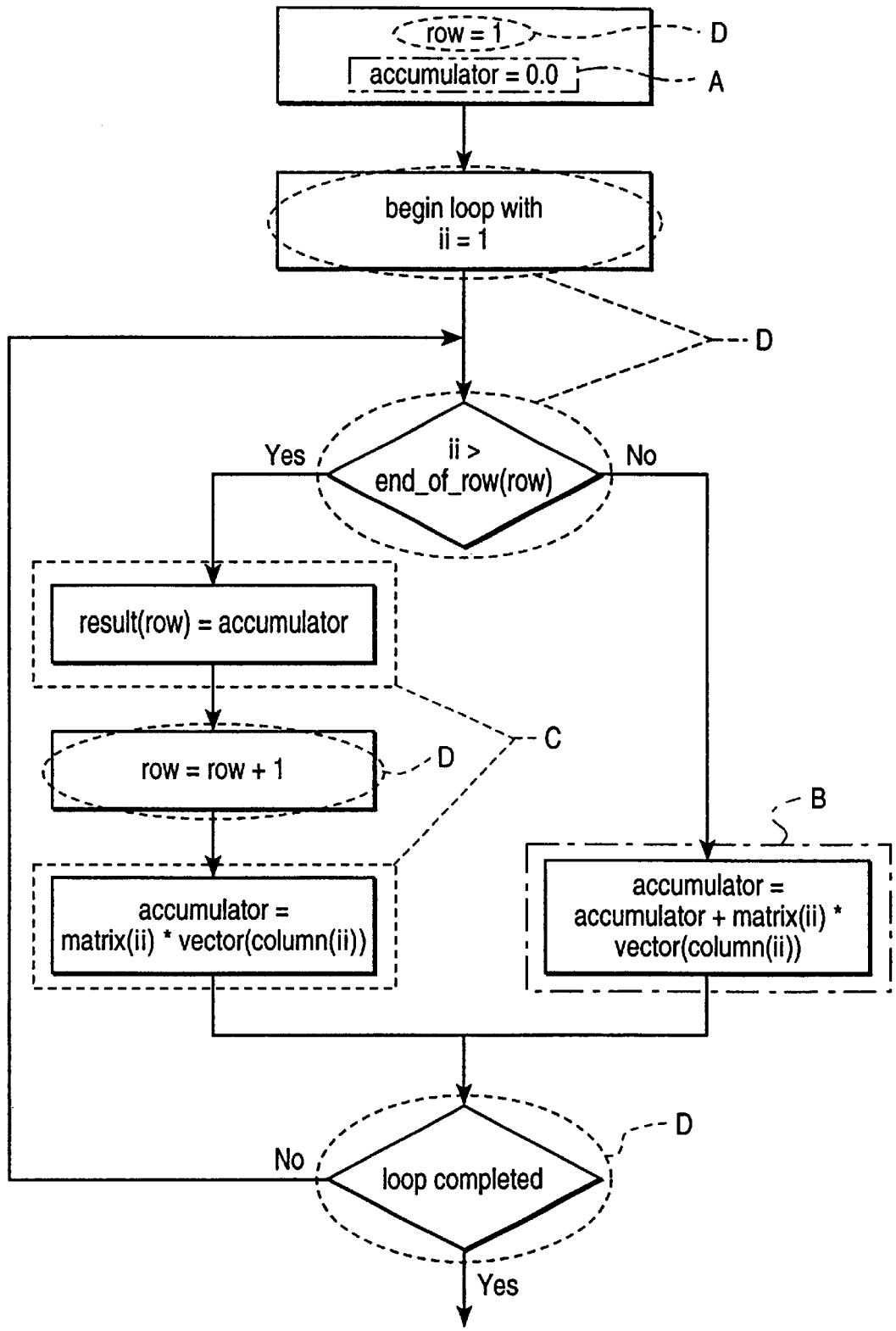

FIG. 5a is similar to FIG. 5, but with the reference numerals removed and certain steps referenced by the letters A, B, C, and D, to more clearly correlate certain steps of the embodiment illustrated in FIGS. 5 and 5a with certain aspects of the present invention. Thus, according to one embodiment of the present invention, a variable is initialized, as denoted by the reference letter A in FIG. 5a. Then, for each element of the second array, either the variable is assigned the sum of the variable and the product of a particular element of the first array and a particular element of the vector, denoted by the reference letter B in FIG. 5a; or, a particular element of the resulting vector is assigned the variable, and then the variable is assigned a particular value, denoted by the reference letter C in FIG. 5a. The reference letter D in FIG. 5a denotes the various steps involved in performing this either-or process for each of the elements of the second array.

Figure 3A:
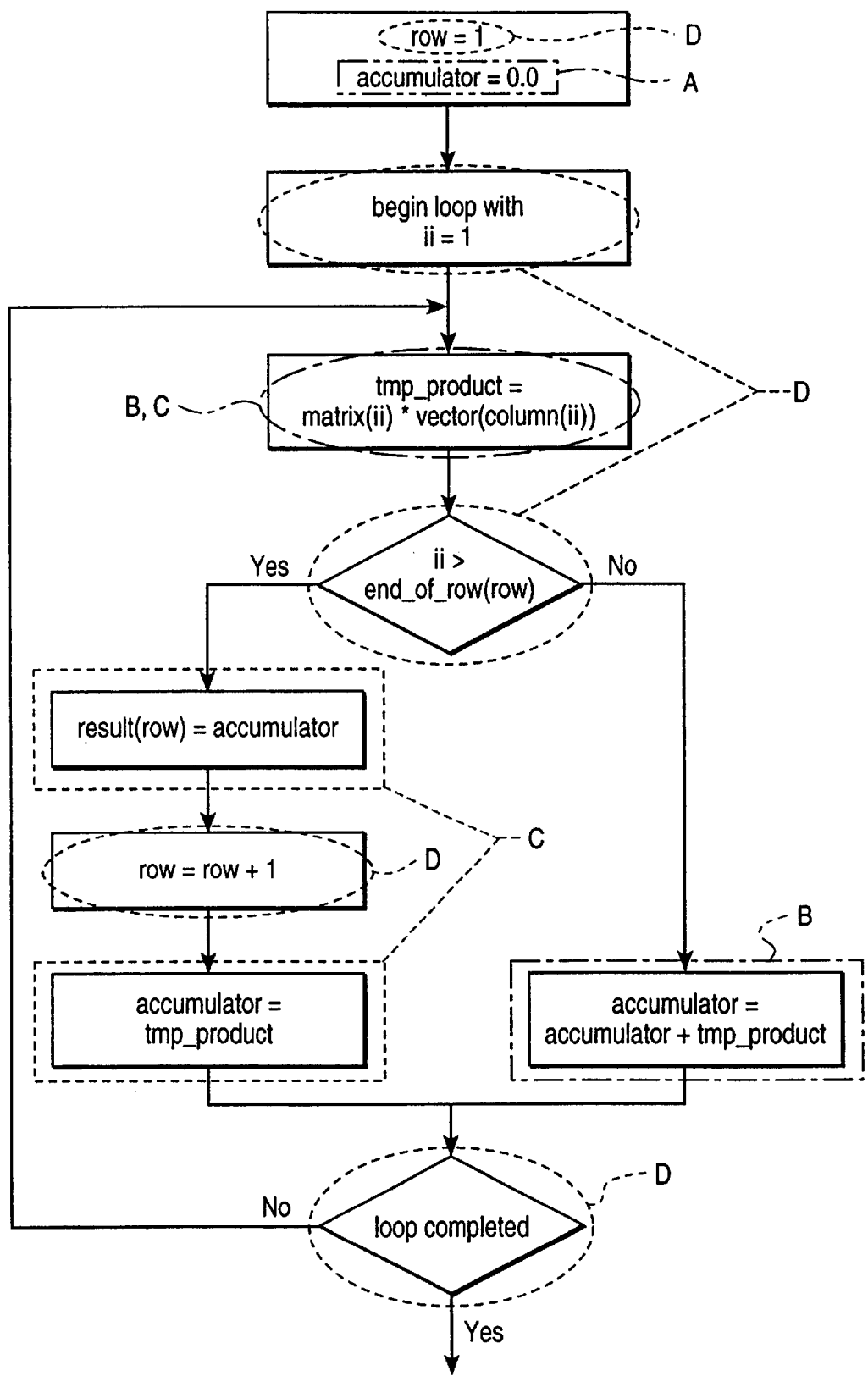

FIG. 3a is similar to FIG. 5a, and further describes the optimized embodiment illustrated in FIG. 3. In this optimized embodiment "tmp_product" is used both in the steps denoted by the reference letter B and in the steps denoted by the reference letter C; consequently both reference letters, B and C, are used in FIG. 3a for the step 330 of FIG. 3.

Figure 6:
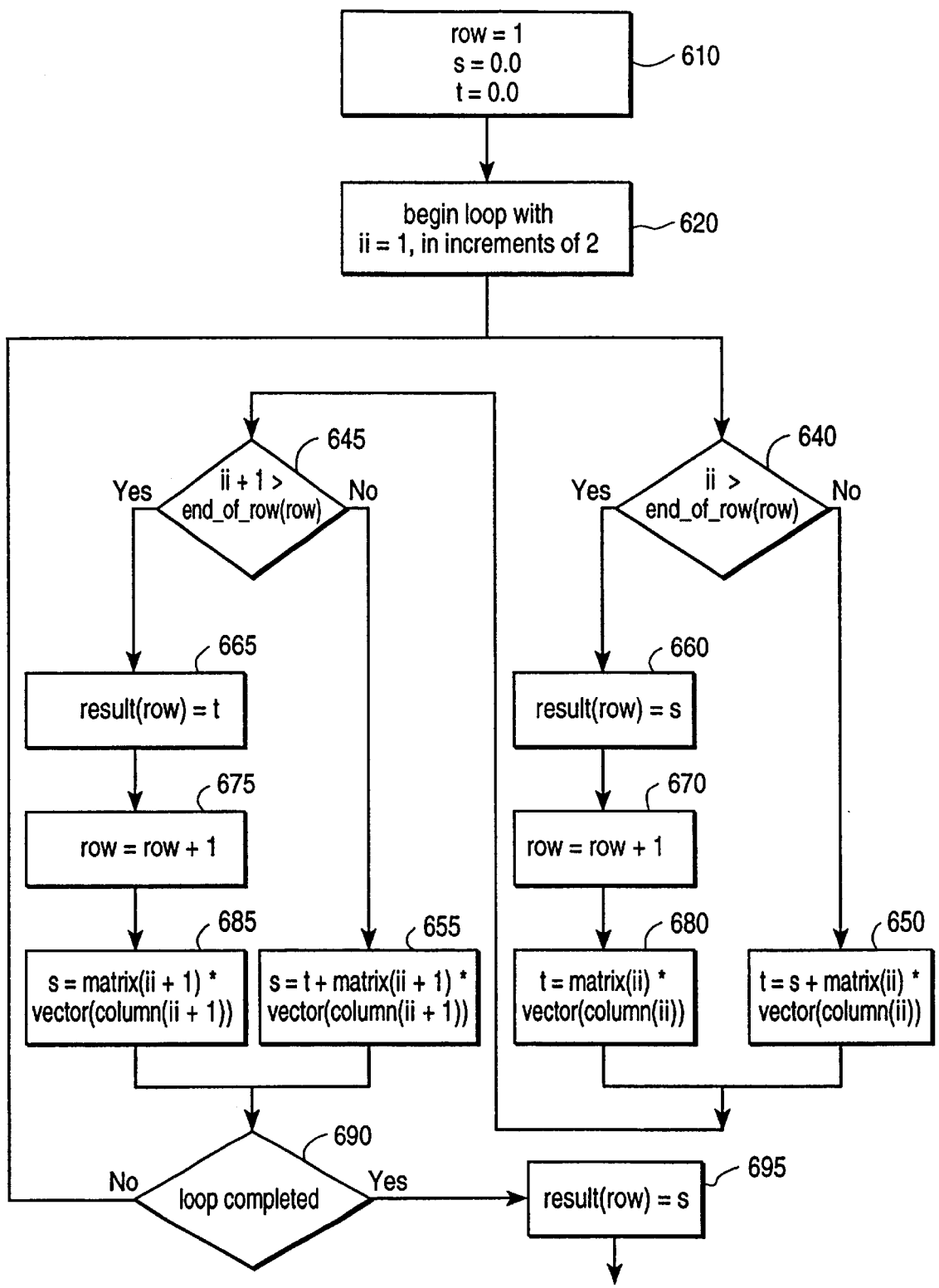
FIG. 6 illustrates a method according to yet another embodiment of the present invention.

In the embodiments of FIGS. 3 and 5, the index variable ii is incremented in increments of 1. In some computer systems, it may be advantageous to increment ii by 2. FIG. 6 illustrates such an embodiment, and sample code is set forth below.

```
row = 1
s = 0.0
t = 0.0
do ii = 1, end_of_row (number_of_rows), 2
    if (ii>end_of_row (row)) then
        result (row) = s
        row = row + 1
        t = matrix (ii) * vector (column (ii))
    else
        t = s + matrix (ii) * vector (column (ii))
    end if
    if ((ii + 1)>end_of_row (row)) then
        result (row) = t
        row = row + 1
        s = matrix (ii + 1) * vector (column (ii + 1))
    else
        s = t + matrix (ii + 1) * vector (column (ii + 1))
    end if
enddo
if (mod(end_of_row (number_of_rows), 2) = 0) result
    (row) = s //stores the final result
in the event that the total count of non-zero elements, end_of_row
(number_of_rows) is even, i.e, divisible by 2
```

The invention as thus far described may advantageously be used to multiply a sparse matrix with a vector. As will be apparent to those skilled in the art from benefit of the description contained herein, the present invention is not limited to applications involving sparse matrices. Rather, it can be used with any matrix containing zero elements and non-zero elements.

Figure 7:
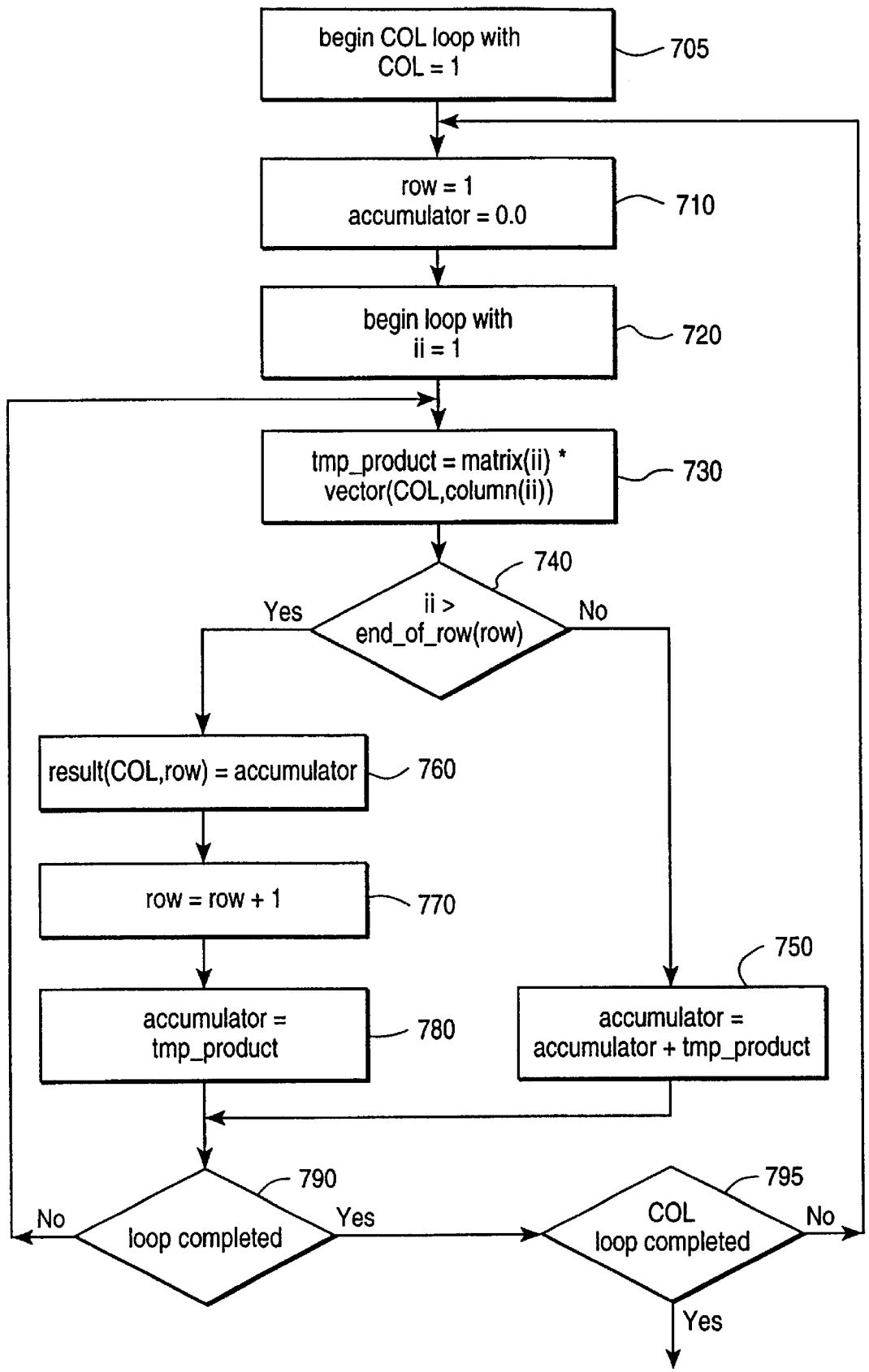
FIG. 7 illustrates a method according to still another embodiment of the present invention.

Additionally, the present invention is not applicable only to multiplying a matrix by a vector. It may advantageously be used to multiply a matrix by another matrix. As described above, a vector is a matrix having a single column; the embodiments of the present invention illustrated in FIGS. 3 and 5 act on the single column of values contained in a column vector. FIG. 7 illustrates the more general case, where the second array, instead of being a column vector, is an array having one or more columns. The steps denoted by reference numerals 710, 720, 730, 740, 750, 760, 770, 780, and 790 are similar to steps illustrated in FIG. 3. Note, however, that in the embodiment illustrated in FIG. 7, the array "vector" and the array "result" each have an additional index, called "COL", which is permitted to vary from 1 to the number of columns contained in the array. This is denoted by the steps labeled 705 and 795 in FIG. 7.

Thus the embodiment illustrated in FIG. 7 can advantageously be used to multiply a matrix having m rows and n columns, containing non-zero elements and zero elements, by an initial array having n rows and p columns, and produce a resulting array having m rows and p columns.

Referring once again to the prior art method illustrated in FIG. 1 and in the sample code set forth above, the difference between "end_of_row (row −1)" minus "end_of_row (row)" determines the iteration count of the inner loop in the prior art method. This difference is dependent on the number of non-zero elements in that row, which varies from row to row and is thus unpredictable. This unpredictability of the loop branch causes mispredictions in modern microprocessors and results in loss of performance.

The present invention recognizes and exploits certain aspects of the computation. When the inner loop is exited, the value of "i" is "end_of_row (row) +1". When the inner loop is re-entered the next time, that is, after the outer loop index "row" has been incremented, the value of "i" is "end_of_row (row +1 −1) +1". Both of these values of "i" are the same, that is, the index variable of the inner loop is incremented sequentially. This means that if the inner loop closing branch was mispredicted after the last iteration of the inner loop, and if as a result of that misprediction the inner loop computation is performed speculatively, then that computed result need not be discarded but rather can be used for the next iteration of the outer loop. Thus the inner loop computation "matrix (i)*vector (column (i))" can be performed regardless of whether the end of the row has been reached. The only aspect of the inner loop computation that changes from one iteration of the outer loop to the next is the accumulator, which changes from "result (row)" to "result (row+1)".

Another important aspect recognized and exploited by the present invention, is that the outer loop sequences through the rows of the matrix, and the inner loop sequences through the elements of each row. Since the rows are all placed end to end in the matrix array, these two loops together essentially sequence through all of the elements in the matrix array. Thus the loop nest can be flattened into a single loop.

The methods of the present invention eliminate the mispredictions that occur in the prior art method at the end of each row. Because the computations are done transparently across the end of each row in the present invention, the scope of prefetching of data elements ("matrix", "end_of_row", and "column") is enhanced, thus enabling better latency hiding.

Latency is a terminology used to describe the time delay that occurs when retrieving elements from memory, e.g., matrix and column. The reformulation of the codes in collapsing the two loops into one single loop with predication enables the present invention to prefetch elements from memory. These elements must be prefetched from memory in a specific amount of time to eliminate the memory latency. That is, the elements must be prefetched from memory in the amount of time it takes to fetch elements from memory (latency of memory) plus the time it takes to fetch elements from the cache (latency of cache).

Figure 8:
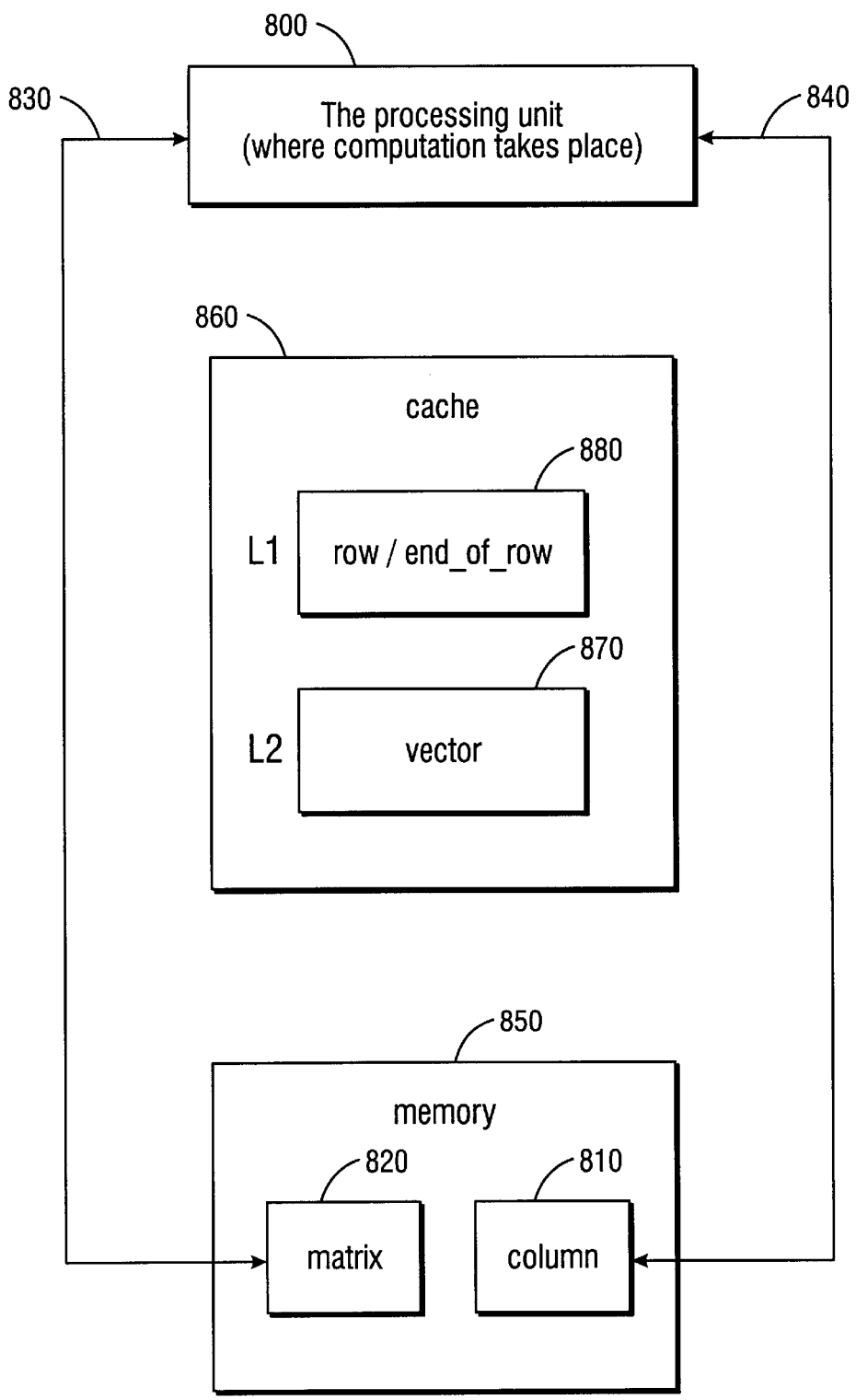
FIG. 8 illustrates the structure of array allocation of the present invention.

FIG. 8 shows the structure of array allocation. Both column 810 and matrix 820 are stored in memory 850. The vector is stored in the second level of cache, L2 870, while row and end_of_row are stored in the first level of cache, L1 880. The microprocessor has to go around, as shown by the arrows 830 and 840, the cache 860 in order to retrieve elements from matrix 820 and column 810. Using the embodiment shown in FIG. 3 and the sample code on page 18, in order to compute tmp_product=matrix(ii)*vector (column (ii)), the elements of column(ii) must be prefetched in the amount of time it takes to fetch elements of column(ii) from memory (latency of memory) plus the time it takes to fetch vector(column(ii)) from cache (latency of L2). Elements from matrix(ii) must be prefetched only in the amount of time it takes to fetch the matrix elements from memory (latency of memory.)

With the penalty associated with branch mispredictions and latency problems removed, performance is largely limited by bandwidth to the data store. Typically, microprocessors could perform the computations in much less time than the time it takes to fetch the elements necessary for the computation. Consequently, the faster the microprocessor fetches the elements, the more computation it can perform. Microprocessors are typically designed with a small amount of bandwidth. Thus, the bandwidth is a scarce resource.

The accesses to the "vector" array possess temporal locality but not spatial locality, and the accesses to the "matrix", "end_of_row", and "column" arrays possess spatial locality, but not temporal locality. This property can advantageously be used in managing cache allocations, such that the "vector" array is stored in the cache hierarchy, and the "matrix", "end_of_row", and "column" arrays bypass the caches. This provides increased performance by eliminating wasted bandwidth caused by accessing the "vector" array via the access path used to access the "matrix", "end_of_row", "column" arrays.

The present invention employs allocation control mechanisms to separate the temporal-nonspatial elements from the nontemporal-spatial elements. Based on these mechanisms, the temporal-nonspatial elements are stored in cache while the nontemporal-spatial elements are not. Vector elements possess temporal-nonspatial characteristics while matrix and column elements possess nontemporal-spatial characteristics. The temporal-nonspatial elements are stored in cache because they will be used again by the microprocessor while the nontemporal-spatial elements are used only once.

Since the nontemporal-spatial elements are used only once, the present invention strides through these column and matrix elements, i.e., using stride one bandwidth. In doing so, the bandwidth is used most efficiently. By using these allocation control mechanisms, the present invention utilizes the microprocessor's scarce and valuable resource, its memory bandwidth, more efficiently and at the same time, maintains the balance of the machine.

Without allocation control mechanisms, the microprocessor would store the nontemporal-spatial elements in cache, which would displace the temporal-nonspatial elements already stored in cache. When the microprocessor needs a temporal-nonspatial element, i.e., a vector element, that was displaced by the nontemporal-spatial element, it would have to gather that element again. Thus, one advantage of the use of allocation control mechanism is that it reduces the bandwidth gather requirement.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer readable medium having instructions, which when executed by a computer, cause the computer to perform operations, said operations comprising:
   creating a first array of elements containing the non-zero elements of a sparse matrix;
   creating a second array of elements containing the row position of the last non-zero element in each row of the sparse matrix;
   initializing a variable; and
   executing a set of instructions for each element of the first array, either equating the variable to the sum of the variable and the product of the element of the first array and a particular element of elements within a vector, or equating a particular element of the resulting vector to the variable, and then equating the variable to a particular value.

2. The computer readable medium of claim 1 wherein the set of instructions is predicated.

3. The computer readable medium of claim 1 wherein the particular value is the product of the element of the first array and the particular element of the vector.

4. The computer readable medium of claim 1 wherein said operations further comprise prefetching the elements of the first array from memory.

5. The computer readable medium of claim 1 further comprising an allocation control mechanism wherein the allocation control mechanism separates the elements of the first array, the elements of the second array and the elements of the vector based on temporal locality and spatial locality.

6. The computer readable medium of claim 1 wherein said operations further comprise storing the elements of the first array, the elements of the second array and the elements of the vector with temporal locality in a cache memory.

7. The computer readable medium of claim 1 wherein said operations further comprise striding through the elements of the first array, the elements of the second array and the elements of the vector with spatial locality.

8. The computer readable medium of claim 1 wherein the elements of the first array maintain spatial locality.

9. The computer readable medium of claim 1 wherein the elements of the vector maintain temporal locality.

10. A method comprising:
    receiving a sparse matrix and a vector, the vector having elements;
    generating the resulting vector, wherein the generating includes:
      creating a first array of elements containing the non-zero elements of the sparse matrix;
      creating a second array of elements containing the row position of the last non-zero element in each row of the sparse matrix;
      initializing a variable; and
      executing a set of computer instructions for each element of the first array, either equating the variable to the sum of the variable and the product of the element of the first array and a particular element of the vector, or equating a particular element of the resulting vector to the variable, and then equating the variable to a particular value.

11. The method of claim 10 wherein the set of instructions is predicated.

12. The method of claim 10 wherein the particular value is the product of the element of the first array and the particular element of the vector.

13. The method of claim 10 further comprising prefetching the elements of the first array from memory.

14. The method of claim 10 wherein the generating of the resulting vector further comprises an allocation control mechanism wherein the allocation control mechanism separates the elements of the first array, the elements of the second array and the elements of the vector based on temporal locality and spatial locality.

15. The method of claim 10 wherein the generating of the resulting vector further comprises storing the elements of the first array, the elements of the second array and the elements of the vector with temporal locality in a cache memory.

16. The method of claim 10 wherein the generating of the resulting vector further comprises striding through the elements of the first array, the elements of the second array and the elements of the vector with spatial locality.

17. The method of claim 10 wherein the elements of the first array maintain spatial locality.

18. The method of claim 10 wherein the elements of the vector maintain temporal locality.

19. A computer system, comprising a microprocessor and a medium containing instructions, wherein the instructions, when executed by a computer, cause the computer to multiply a sparse matrix by a vector having elements and produce a resulting vector, by performing the following:
    creating a first array of elements containing the non-zero elements of the sparse matrix;
    creating a second array of elements containing the row position of the last non-zero element in each row of the sparse matrix;
    initializing a variable; and
    executing a set of instructions for each element of the first array, either equating the variable to the sum of the variable and the product of the element of the first array and a particular element of the vector, or equating a particular element of the resulting vector to the variable, and then equating the variable to a particular value.

20. The computer system of claim 19 wherein the set of instructions is predicated.

21. The computer system of claim 19 wherein the particular value is the product of the element of the first array and the particular element of the vector.

22. The computer system of claim 19 further prefetching the elements of the first array, from memory.

23. The computer system of claim 19 further comprising an allocation control mechanism wherein the allocation control mechanism separates the elements of the first array, the elements of the second array and the elements of the vector based on temporal locality and spatial locality.

24. The computer system of claim 19 further storing the elements of the first array, the elements of the second array and the elements of the vector with temporal locality in a cache memory.

25. The computer system of claim 19 further striding through the elements of the first array, the elements of the second array and the elements of the vector with spatial locality.

26. The computer system of claim 19 wherein the elements of the first array maintain spatial locality.

27. The computer system of claim 19 wherein the elements of the vector maintain temporal locality.

28. A computer readable medium having instructions, which when executed by a computer, causes the computer to perform operations, said operations comprising:

creating a first array of elements containing non-zero elements of a matrix;

creating a second array of elements containing the row position of the last non-zero element in each row of the matrix;

creating a third array of elements containing the column position of each non-zero element of the matrix;

initializing a first variable;

initializing a second variable;

generating a resulting vector based on the first array, the second array, the third array and an initial vector, wherein the generating includes:

executing a set of instructions for an index incremented from 1 to the last element of the second array, in increments of 1, the set of instructions including:

equating a third variable to the product of the element of the first array corresponding to the index, and an element of the initial vector corresponding to the element of the third array corresponding to the index;

if the index is less than or equal to the element of the second array corresponding to the first variable, equating the second variable to the sum of the second variable and the third variable;

if the index is greater than the element of the second array corresponding to the first variable, equating the element of the resulting vector corresponding to the first variable to the second variable, incrementing the first variable by 1, and equating the second variable to a particular value.

29. The computer readable medium of claim 28 wherein the set of instructions is predicated.

30. The computer readable medium of claim 28 wherein said operations further comprise prefetching the elements of the first array and the elements of the third array from memory.

31. The computer readable medium of claim 28 further comprising an allocation control mechanism wherein the allocation control mechanism separates the elements of the first array, the elements of the second array, the elements of the third array and the elements of the vector based on temporal locality and spatial locality.

32. The computer readable medium of claim 28 wherein said operations further comprise storing the elements of the first array, the elements of the second array, the elements of the third array and the elements of the vector with temporal locality in a cache memory.

33. The computer readable medium of claim 28 wherein said operations further comprise striding through the elements of the first array, the elements of the second array, the elements of the third array and the elements of the vector with spatial locality.

34. The computer readable medium of claim 28 wherein the elements of the first array and the elements of the third array maintain spatial locality.

35. The computer readable medium of claim 28 wherein the elements of the vector maintain temporal locality.

36. The computer readable medium of claim 28 wherein the particular value is the product of the element of the first array corresponding to the index, and the element of the vector corresponding to the element of the third array corresponding to the index.

37. The computer readable medium of claim 28 further including instructions which, when executed by the computer, cause the computer to perform the following:

storing at least a portion of the vector in a first memory; and storing the first array and/or the second array and/or the third array in a second memory.

38. The computer readable medium of claim 37 wherein the storing in a first memory includes storing in a cache memory.

39. The computer readable medium of claim 37 further including instructions which, when executed by the computer, cause the computer to perform the following:

accessing the vector stored in the first memory via a first access path; and accessing the first array and/or the second array and/or the third array stored in the second memory via an access path different from said first access path.

40. A method comprising:

receiving a matrix and a vector, the matrices having rows and columns containing non-zero elements and zero elements, the vector having elements;

generating a resulting vector, wherein the generating includes:

creating a first array of elements containing the non-zero elements of the matrix;

creating a second array of elements containing the row position of the last non-zero element in each row of the matrix;

creating a third array of elements containing the column position of each non-zero element of the matrix;

initializing a first variable;

initializing a second variable;

executing a set of computer instructions for an index incremented from 1 to the last element of the second array, in increments of 1, equating a third variable to the product of the element of the first array, corresponding to the index, and the element of the vector corresponding to the element of the third array corresponding to the index;

if the index is less than or equal to the element of the second array corresponding to the first variable, equating the second variable to the sum of the second variable and the third variable;

if the index is greater than the element of the second array corresponding to the first variable, equating the element of the resulting vector corresponding to the first variable to the second variable, incrementing the first variable by 1, and equating the second variable to a particular value.

41. The method of claim 40 wherein the set of instructions is predicated.

42. The method of claim 40 further comprising prefetching the elements of the first array and the elements of the third array from memory.

43. The method of claim 40 wherein the generating of the resulting vector further comprises an allocation control mechanism wherein the allocation control mechanism separates the elements of the first array, the elements of the second array, the elements of the third array and the elements of the vector based on locality and spatial locality.

44. The method of claim 40 wherein the generating of the resulting vector further comprises storing the elements of the first array, the elements of the second array, the elements of the third array and the elements of the vector with temporal locality in a cache memory.

45. The method of claim 40 wherein the generating of the resulting vector further comprises striding through the elements of the first array, the elements of the second array, the elements of the third array and the elements of the vector with spatial locality.

46. The method of claim 40 wherein the elements of the first array and the elements of the third array maintain spatial locality.

47. The method of claim 40 where in the elements of the vector maintain temporal locality.

48. The method of claim 40 wherein the particular value is the product of the element of the first array corresponding to the index, and the element of the vector corresponding to the element of the third array corresponding to the index.

49. The method of claim 40 further comprising:

storing at least a portion of the vector in a first memory; and storing the first array and/or the second array and/or the third array in a second memory.

50. The method of claim 49 wherein the storing in the first memory includes storing in a cache memory.

51. The method of claim 49 further comprising:

accessing the vector stored in the first memory via a first access path; and accessing the first array and/or the second array and/or the third array stored in the second memory via an access path different from said first access path.

52. A computer system, comprising a microprocessor and a medium containing instructions, wherein the instructions, when executed by a computer, cause the computer to multiply a matrix having rows and columns containing non-zero elements and zero elements by a vector having elements and produce a resulting vector, by performing the following:

creating a first array of elements containing the non-zero elements of the matrix;

creating a second array of elements containing the row position of the last non-zero element in each row of the matrix;

creating a third array of elements containing the column position of each non-zero element of the matrix;

initializing a first variable;

initializing a second variable; executing a set of instructions for an index incremented from 1 to the last element of the second array, in increments of 1, equating a third variable to the product of the element of the first array corresponding to the index, and the element of the vector corresponding to the element of the third array corresponding to the index;

if the index is less than or equal to the element of the second array corresponding to the first variable, equating the second variable to the sum of the second variable and the third variable;

if the index is greater than the element of the second array corresponding to the first variable, equating the element of the resulting vector corresponding to the first variable to the second variable, incrementing the first variable by 1, and equating the second variable to a particular value.

53. The computer system of claim 52 wherein the set of instructions is predicated.

54. The computer system of claim 52 further prefetching the elements of the first array and the elements of the third array from memory.

55. The computer system of claim 52 further comprising an allocation control mechanism wherein the allocation control mechanism separates the elements of the first array, the elements of the second array, the elements of the third array and the elements of the vector based on temporal locality and spatial locality.

56. The computer system of claim 52 further storing the elements of the first array, the elements of the second array, the elements of the third array and the elements of the vector with temporal locality in a cache memory.

57. The computer system of claim 52 further striding through the elements of the first array, the elements of the second array, the elements of the third array and the elements of the vector with spatial locality.

58. The computer system of claim 52 wherein the elements of the first array and the elements of the third array maintain spatial locality.

59. The computer system of claim 52 wherein the elements of the vector maintain temporal locality.

60. The computer system of claim 52 wherein the particular value is the product of the element of the first array corresponding to the index, and the element of the vector corresponding to the element of the third array corresponding to the index.

61. The computer system of claim 52 further including instructions which, when executed by the computer, cause the computer to perform the following:

storing at least a portion of the vector in a first memory; and storing the first array and/or the second array and/or the third array in a second memory.

62. The computer system of claim 61 wherein the storing in the first memory includes storing in a cache memory.

63. The computer system of claim 61 wherein:

the vector stored in the first memory is accessed via a first access path; and the first array and/or the second array and/or the third array stored in the second memory is accessed via an access path different from said first access path.

64. A computer readable medium having instructions, which when executed by a computer, cause the computer to perform operations, said operations comprising:

creating a first array of elements containing non-zero elements of a matrix, the matrix having m rows and n columns;

creating a second array of elements containing the row position of the last non-zero element in each row of the matrix;

creating a third array of elements containing the column position of each non-zero element of the matrix;

generating a resulting array based on the first array, the second array, the third array and an initial array, wherein the generating includes:

executing a set of instructions for each column of the initial array and the resulting array, incremented from 1 top in increments of 1, wherein the initial array has n rows and p columns and the resulting array having m rows and p columns, the set of instructions including:

initializing a first variable;

initializing a second variable;

for an index incremented from 1 to the last element of the second array, in increments of 1, equating a third variable to the product of the element of the first array corresponding to the index, and the element of the initial array corresponding to the element of the third array corresponding to the index;

if the index is less than or equal to the element of the second array corresponding to the first variable, equating the second variable to the sum of the second variable and the third variable;

if the index is greater than the element of the second array corresponding to the first variable, equating the element of the resulting array corresponding to the first variable to the second variable, incrementing the first variable by 1, and equating the second variable to a particular value.

65. The computer readable medium of claim 64 wherein the set of instructions is predicated.

66. The computer readable medium of claim 64 wherein said operations further comprise prefetching the elements of the first array and the elements of the third array from memory.

67. The computer readable medium of claim 64 further comprising an allocation control mechanism wherein the allocation control mechanism separates the elements of the first array, the elements of the second array, the elements of the third array and the elements of the vector based on temporal locality and spatial locality.

68. The computer readable medium of claim 64 wherein said operations further comprise storing the elements of the first array, the elements of the second array, the elements of the third array and the elements of the vector with temporal locality in a cache memory.

69. The computer readable medium of claim 64 wherein said operations further comprise striding through the elements of the first array, the elements of the second array, the elements of the third array and the elements of the vector with spatial locality.

70. The computer readable medium of claim 64 wherein the elements of the first array and the elements of the third array maintain spatial locality.

71. The computer readable medium of claim 64 wherein the elements of the initial array maintain temporal locality.

72. The computer readable medium of claim 64 wherein p is greater than 1.

73. A method comprising:
receiving a matrix and an initial array, the sparse matrix having m rows and n columns containing non-zero elements and zero elements, the initial array having n rows and p columns containing elements;
generating a resulting array having m rows and p columns, wherein the generating includes:
creating a first array of elements containing the non-zero elements of the matrix;
creating a second array of elements containing the row position of the last non-zero element in each row of the matrix;
creating a third array of elements containing the column position of each non-zero element of the matrix;
executing a set of computer instructions for each column of the initial array and the resulting array, incremented from 1 to p in increments of 1, initializing a first variable;
initializing a second variable;
for an index incremented from 1 to the last element of the second array, in increments of 1, equating a third variable to the product of the element of the first array corresponding to the index, and the element of the initial array corresponding to the element of the third array corresponding to the index;
if the index is less than or equal to the element of the second array corresponding to the first variable, equating the second variable to the sum of the second variable and the third variable;
if the index is greater than the element of the second array corresponding to the first variable, equating the element of the resulting array corresponding to the first variable to the second variable, incrementing the first variable by 1, and equating the second variable to a particular value.

74. The method of claim 73 wherein the set of instructions is predicated.

75. The method of claim 73 further comprising prefetching the elements of the first array and the elements of the third array from memory.

76. The method of claim 73 wherein the generating of the resulting vector further comprises an allocation control mechanism wherein the allocation control mechanism separates the elements of the first array, the elements of the second array, the elements of the third array and the elements of the vector based on temporal locality and spatial locality.

77. The method of claim 73 wherein the generating of the resulting vector further comprises storing the elements of the first array, the elements of the second array, the elements of the third array and the elements of the vector with temporal locality in a cache memory.

78. The method of claim 73 wherein the generating of the resulting vector further comprises striding through the elements of the first array, the elements of the second array the elements of the third array and the elements of the vector with spatial locality.

79. The method of claim 73 wherein the elements of the first array and the elements of the third array maintain spatial locality.

80. The method of claim 73 wherein the elements of the initial array maintain temporal locality.

81. The method of claim 73 wherein p is greater than 1.

82. A computer system, comprising a microprocessor and a medium containing instructions, wherein the instructions, when executed by a computer, cause the computer to multiply a matrix having m rows and n columns containing non-zero elements and zero elements by an initial array having n rows and p columns containing elements and produce a resulting array having m rows and p columns, by performing the following:
creating a first array of elements containing the non-zero elements of the matrix;
creating a second array of elements containing the row position of the last non-zero element in each row of the matrix;
creating a third array of elements containing the column position of each non-zero element of the matrix;
executing a set of instructions for each column of the initial array and the resulting array, incremented from 1 top in increments of 1, initializing a first variable; initializing a second variable;
for an index incremented from 1 to the last element of the second array, in increments of 1, equating a third variable to the product of the element of the first array corresponding to the index, and the element of the initial array corresponding to the element of the third array corresponding to the index;
if the index is less than or equal to the element of the second array corresponding to the first variable, equating the second variable to the sum of the second variable and the third variable;
if the index is greater than the element of the second array corresponding to the first variable, equating the element of the resulting array corresponding to the first variable to the second variable, incrementing the first variable by 1, and equating the second variable to a particular value.

83. The computer system of claim 82 wherein the set of instructions is predicated.

84. The computer system of claim 82 further prefetching the elements of the first array and the elements of the third array from memory.

85. The computer system of claim 82 further comprising an allocation control mechanism wherein the allocation control mechanism separates the elements of the first array, the elements of the second array, the elements of the third array and the elements of the vector based on temporal locality and spatial locality.

86. The computer system of claim 82 further storing the elements of the first array, the elements of the second array, the elements of the third array and the elements of the vector with temporal locality in a cache memory.

87. The computer system of claim 82 further striding through the elements of the first array, the elements of the second array, the elements of the third array and the elements of the vector with spatial locality.

88. The computer system of claim 82 wherein the elements of the first array and the elements of the third array maintain spatial locality.

89. The computer system of claim 82 wherein the elements of the initial array maintain temporal locality.

90. The computer system of claim 82 wherein is greater than 1.

91. A computer readable medium having instructions, which when executed by a computer, cause the computer to perform operations, said operations comprising:
creating a first array of elements containing the non-zero elements of a matrix;
creating a second array of elements containing the row position of the last non-zero element in each row of the matrix;
creating a third array of elements containing the column position of each non-zero element of the matrix;
initializing a first variable;
initializing a second variable;
generating a resulting vector based on the first array, the second array, the third array and a vector, the vector having elements, wherein the generating includes:
executing a set of instructions for an index incremented from 1 to the last element of the second array, in increments of 1, the set of instructions including:
if the index is less than or equal to the element of the second array corresponding to the first variable, equating the second variable to the sum of the second variable and the product of the element of the first array corresponding to the index, and the element of the vector corresponding to the element of the third array corresponding to the index; and
if the index is greater than the element of the second array corresponding to the first variable, equating the element of the resulting vector corresponding to the first variable to the second variable, incrementing the variable by 1, and equating the second variable to a particular value.

92. The computer readable medium of claim 91 wherein the set of instructions is predicated.

93. The computer readable medium of claim 91 wherein said operations further comprise prefetching the elements of the first array and the elements of the third array from memory.

94. The computer readable medium of claim 91 further comprising an allocation control mechanism wherein the allocation control mechanism separates the elements of the first array, the elements of the second array, the elements of the third array and the elements of the vector based on temporal locality and spatial locality.

95. The computer readable medium of claim 91 wherein said operations further comprise storing the elements of the first array, the elements of the second array, the elements of the third array and the elements of the vector with temporal locality in a cache memory.

96. The computer readable medium of claim 91 wherein said operations further comprise striding through the elements of the first array, the elements of the second array, the elements of the third array and the elements of the vector with spatial locality.

97. The computer readable medium of claim 91 wherein the elements of the first array and the elements of the third array maintain spatial locality.

98. The computer readable medium of claim 91 wherein the elements of the vector maintain temporal locality.

99. A method comprising:
receiving a matrix and a vector, the matrix having rows and columns containing non-zero elements and zero elements, the vector containing elements;
generating a resulting vector, wherein the generating includes:
creating a first array of elements containing the non-zero elements of the matrix;
creating a second array of elements containing the row position of the last non-zero element in each row of the matrix;
creating a third array of elements containing the column position of each non-zero element of the matrix;
initializing a first variable;
initializing a second variable;
executing a set of computer instructions for an index incremented from 1 to the last element of the second array, in increments of 1, if the index is less than or equal to the element of the second array corresponding to the first variable, equating the second variable to the sum of the second variable and the product of the element of the first array corresponding to the index, and the element of the vector corresponding to the element of the third array corresponding to the index;
if the index is greater than the element of the second array corresponding to the first variable, equating the element of the resulting vector corresponding to the first variable to the second variable, incrementing the first variable by 1, and equating the second variable to a particular value.

100. The method of claim 99 wherein the set of instructions is predicated.

101. The method of claim 99 further comprising prefetching the elements of the first array and the elements of the third array from memory.

102. The method of claim 99 wherein the generating of the resulting vector further comprises an allocation control mechanism wherein the allocation control mechanism separates the elements of the first array, the elements of the second array, the elements of the third array and the elements of the vector based on temporal locality and spatial locality.

103. The method of claim 99 wherein the generating of the resulting vector further comprises storing the elements of the first array, the elements of the second array, the elements of the third array and the elements of the vector with temporal locality in a cache memory.

104. The method of claim 99 wherein the generating of the resulting vector further comprises striding through the elements of the first array, the elements of the second array, the elements of the third array and the elements of the vector with spatial locality.

105. The method of claim 99 wherein the elements of the first array and the elements of the third array maintain spatial locality.

106. The method of claim 99 wherein the elements of the vector maintain temporal locality.

107. A computer system, comprising a microprocessor and a medium containing instructions, wherein the instructions, when executed by a computer, cause the computer to multiply a matrix having rows and columns containing non-zero elements and zero elements by a vector containing elements and produce a resulting vector, by performing the following:

creating a first array of elements containing the non-zero elements of the matrix;

creating a second array of elements containing the row position of the last non-zero element in each row of the matrix;

creating a third array of elements containing the column position of each non-zero element of the matrix;

initializing a first variable;

initializing a second variable;

executing a set of instructions for an index incremented from 1 to the last element of the second array, in increments of 1, if the index is less than or equal to the element of the second array corresponding to the first variable, equating the second variable to the sum of the second variable and the product of the element of the first array, corresponding to the index, and the element of the vector corresponding to the element of the third array corresponding to the index;

if the index is greater than the element of the second array corresponding to the first variable, equating the element of the resulting vector corresponding to the first variable to the second variable, incrementing the first variable by 1, and equating the second variable to a particular value.

108. The computer system of claim 107 wherein the set of instructions is predicated.

109. The computer system of claim 107 further prefetching the elements of the first array and the elements of the third array from memory.

110. The computer system of claim 107 further comprising an allocation control mechanism wherein the allocation control mechanism separates the elements of the first array, the elements of the second array, the elements of the third array and the elements of the vector based on temporal locality and spatial locality.

111. The computer system of claim 107 further storing the elements of the first array, the elements of the second array, the elements of the third array and the elements of the vector with temporal locality in a cache memory.

112. The computer system of claim 107 further striding through the elements of the first array, the elements of the second array, the elements of the third array and the elements of the vector with spatial locality.

113. The computer system of claim 107 where in the elements of the first array and the elements of the third array maintain spatial locality.

114. The computer system of claim 107 wherein the elements of the vector maintain temporal locality.

115. A computer readable medium having instructions, which when executed by a computer, cause the computer to perform operations, said operations comprising:

creating a first array of elements containing the non-zero elements of a matrix;

creating a second array of elements containing the row position of the last non-zero element in each row of the matrix;

creating a third array of elements containing the column position of each non-zero element of the matrix;

initializing a first variable;

initializing a second variable;

initializing a third variable;

generating a resulting vector based on the first array, the second array, the third array and a vector, the vector having elements, the generating including:

executing a set of instructions for an index incremented from 1 to the last element of the second array, in increments of 2, the set of instructions including:

if the index is less than or equal to the element of the second array corresponding to the first variable, equating the second variable to the sum of the third variable and the product of the element of the first array corresponding to the index, and the element of the vector corresponding to the element of the third array corresponding to the index;

if the index is greater than the element of the second array corresponding to the first variable, equating the element of the resulting vector corresponding to the first variable to the third variable, incrementing the first variable by 1, and equating the second variable to the product of the element of the first array corresponding to the index, and the element of the vector corresponding to the element of the third array corresponding to the index;

if the index+1 is less than or equal to the element of the second array corresponding to the first variable, equating the third variable to the sum of the second variable and the product of the element of the first array, corresponding to the index+1, and the element of the vector corresponding to the element of the third array corresponding to the index+1;

if the index+1 is greater than the element of the second array corresponding to the first variable, equating the element of the resulting vector corresponding to the first variable to the second variable, incrementing the first variable by 1, and equating the third variable to the product of the element of the first array corresponding to the index+1, and the element of the vector corresponding to the element of the third array corresponding to the index+1; and then equating the element of the resulting vector corresponding to the first variable to the third variable when the last element of the second array is even.

116. The computer readable medium of claim 115 wherein the set of instructions is predicated.

117. The computer readable medium of claim 115 wherein said operations further comprise prefetching the elements of the first array and the elements of the third array from memory.

118. The computer readable medium of claim 115 further comprising an allocation control mechanism wherein the allocation control mechanism separates the elements of the first array, the elements of the second array, the elements of the third array and the elements of the vector based on temporal locality and spatial locality.

119. The computer readable medium of claim 115 wherein said operations further comprise storing the elements of the first array, the elements of the second array, the elements of the third array and the elements of the vector with temporal locality in a cache memory.

120. The computer readable medium of claim 115 wherein said operations further comprise striding through the elements of the first array, the elements of the second array, the elements of the third array and the elements of the vector with spatial locality.

121. The computer readable medium of claim 115 wherein the elements of the first array and the elements of the third array maintain spatial locality.

122. The computer readable medium of claim 115 wherein the elements of the vector maintain temporal locality.

123. A method comprising:
receiving a matrix and a vector, the matrix having rows and columns containing non-zero elements and zero elements, the vector containing elements;
generating a resulting vector, wherein the generating includes:
creating a first array of elements containing the non-zero elements of the matrix;
creating a second array of elements containing the row position of the last non-zero element in each row of the matrix;
creating a third array of elements containing the column position of each non-zero element of the matrix;
initializing a first variable;
initializing a second variable;
initializing a third variable;
executing a set of computer instructions for an index incremented from 1 to the last element of the second array, in increments of 2, if the index is less than or equal to the element of the second array corresponding to the first variable, equating the second variable to the sum of the third variable and the product of the element of the first array corresponding to the index, and the element of the vector corresponding to the element of the third array corresponding to the index;
if the index is greater than the element of the second array corresponding to the first variable, equating the element of the resulting vector corresponding to the first variable to the third variable, incrementing the first variable by 1, and equating the second variable to the product of the element of the first array, corresponding to the index, and the element of the vector corresponding to the element of the third array corresponding to the index;
if the index+1 is less than or equal to the element of the second array corresponding to the first variable, equating the third variable to the sum of the second variable and the product of the element of the first array corresponding to the index+1, and the element of the vector corresponding to the element of the third array corresponding to the index+1;
if the index+1 is greater than the element of the second array corresponding to the first variable, equating the element of the resulting vector corresponding to the first variable to the second variable, incrementing the first variable by 1, and equating the third variable to the product of the element of the first array corresponding to the index+1, and the element of the vector corresponding to the element of the third array corresponding to the index+1; and then equating the element of the resulting vector corresponding to the first variable to the third variable only if the last element of the second array is even.

124. The method of claim 123 wherein the set of instructions is predicated.

125. The method of claim 123 further comprising prefetching the elements of the first array and the elements of the third array from memory.

126. The method of claim 123 wherein the generating of the resulting vector further comprises an allocation control mechanism wherein the allocation control mechanism separates the elements of the first array, the elements of the second array, the elements of the third array and the elements of the vector based on temporal locality and spatial locality.

127. The method of claim 123 wherein the generating of the resulting vector further comprises storing the elements of the first array, the elements of the second array, the elements of the third array and the elements of the vector with temporal locality in a cache memory.

128. The method of claim 123 wherein the generating of the resulting vector further comprises striding through the elements of the first array, the elements of the second array, the elements of the third array and the elements of the vector with spatial locality.

129. The method of claim 123 wherein the elements of the first array and the elements of the third array maintain spatial locality.

130. The method of claim 123 wherein the elements of the vector maintain temporal locality.

131. A computer system, comprising a microprocessor and a medium containing instructions, wherein the instructions, when executed by a computer, cause the computer to multiply a matrix having rows and columns containing non-zero elements and zero elements by a vector containing elements and produce a resulting vector, by performing the following:
creating a first array of elements containing the non-zero elements of the matrix;
creating a second array of elements containing the row position of the last non-zero element in each row of the matrix;
creating a third array of elements containing the column position of each non-zero element of the matrix;
initializing a first variable;
initializing a second variable;
initializing a third variable;
executing a set of instructions for an index incremented from 1 to the last element of the second array, in increments of 2, if the index is less than or equal to the element of the second array corresponding to the first variable, equating the second variable to the sum of the third variable and the product of the element of the first array, corresponding to the index, and the element of the vector corresponding to the element of the third array corresponding to the index;
if the index is greater than the element of the second array corresponding to the first variable, equating the element of the resulting vector corresponding to the first variable to the third variable, incrementing the first variable by 1, and equating the second variable to the product of the element of the first array, corresponding to the index, and the element of the vector corresponding to the element of the third array corresponding to the index;
if the index+1 is less than or equal to the element of the second array corresponding to the first variable, equating the third variable to the sum of the second variable and the product of the element of the first array, corresponding to the index+1, and the element of the vector corresponding to the element of the third array corresponding to the index+1;
if the index+1 is greater than the element of the second array corresponding to the first variable, equating the element of the resulting vector corresponding to the first variable to the second variable, incrementing the first variable by 1, and equating the third variable to the product of the element of the first array, corresponding to the index+1, and the element of the vector corresponding to the element of the third array corresponding to the index+1; and then equating the element of the resulting vector corresponding to the first variable to the third variable when the last element of the second array is even.

132. The computer system of claim 131 wherein the set of instructions is predicated.

133. The computer system of claim 131 further prefetching the elements of the first array and the elements of the third array from memory.

134. The computer system of claim 131 further comprising an allocation control mechanism wherein the allocation control mechanism separates the elements of the first array, the elements of the second array, the elements of the third array and the elements of the vector based on temporal locality and spatial locality.

135. The computer system of claim 131 further storing the elements of the first array, the elements of the second array, the elements of the third array and the elements of the vector with temporal locality in a cache memory.

136. The computer system of claim 131 further striding through the elements of the first array, the elements of the second array, the elements of the third array and the elements of the vector with spatial locality.

137. The computer system of claim 131 wherein the elements of the first array and the elements of the third array maintain spatial locality.

138. The computer system of claim 131 wherein the elements of the vector maintain temporal locality.

* * * * *

UNITED STATES PATENT AND TRADEMARK OFFICE
CERTIFICATE OF CORRECTION

PATENT NO.    : 6,243,734 B1  
DATED         : June 5, 2001  
INVENTOR(S)   : Doshi et al.

It is certified that error appears in the above-identified patent and that said Letters Patent is hereby corrected as shown below:

<u>Column 18,</u>
Line 52, delete "top" and insert -- to p --.

Signed and Sealed this

Thirtieth Day of September, 2003

JAMES E. ROGAN
*Director of the United States Patent and Trademark Office*